(12) United States Patent
Haraguchi

(10) Patent No.: US 11,412,168 B2
(45) Date of Patent: Aug. 9, 2022

(54) IMAGING ELEMENT AND METHOD OF CONTROLLING THE SAME, AND IMAGING DEVICE

(71) Applicant: CANON KABUSHIKI KAISHA, Tokyo (JP)

(72) Inventor: Kazuki Haraguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/824,130

(22) Filed: Mar. 19, 2020

(65) Prior Publication Data
US 2020/0322560 A1    Oct. 8, 2020

(30) Foreign Application Priority Data

Apr. 2, 2019 (JP) .............................. JP2019-070750

(51) Int. Cl.
*H04N 5/378* (2011.01)
*H04N 5/3745* (2011.01)
*H04N 5/376* (2011.01)
*H04N 5/343* (2011.01)

(52) U.S. Cl.
CPC ............ *H04N 5/378* (2013.01); *H04N 5/343* (2013.01); *H04N 5/3765* (2013.01); *H04N 5/37455* (2013.01); *H04N 5/37457* (2013.01)

(58) Field of Classification Search
CPC .. H04N 5/378; H04N 5/37457; H04N 5/3765; H04N 5/37455; H04N 5/343; H04N 5/351; H04N 5/341
See application file for complete search history.

(56) References Cited

U.S. PATENT DOCUMENTS

| 2008/0180547 | A1* | 7/2008 | Hirose | H04N 5/35563 348/229.1 |
| 2015/0163430 | A1* | 6/2015 | Kanemitsu | H04N 5/35563 348/308 |
| 2017/0180663 | A1* | 6/2017 | Mabuchi | H04N 5/378 |
| 2019/0280031 | A1* | 9/2019 | Oh | H01L 27/14616 |
| 2020/0036930 | A1* | 1/2020 | Hanzawa | H04N 5/374 |
| 2020/0227454 | A1* | 7/2020 | Geurts | H04N 5/3559 |

FOREIGN PATENT DOCUMENTS

JP       2014222899 A    11/2014

* cited by examiner

*Primary Examiner* — Nhan T Tran
(74) *Attorney, Agent, or Firm* — Carter, DeLuca & Farrell LLP

(57) ABSTRACT

An imaging element included in an imaging device includes a pixel array in which a plurality of unit pixels are arranged in a matrix, each of the unit pixels having a photoelectric conversion unit. The imaging element is able to read out multiple rows of pixel signals in parallel in a unit horizontal synchronous period. The multiple rows of pixel groups are classified into a first pixel group and a second pixel group by a plurality of rows control signals, and are periodically arranged in a vertical direction of the imaging element. The imaging element is able to acquire signals obtained by multiplying different gains by pixel signals of unit pixels of the first pixel group and pixel signals of unit pixels of the second pixel group through setting of a plurality of rows control signals.

13 Claims, 16 Drawing Sheets

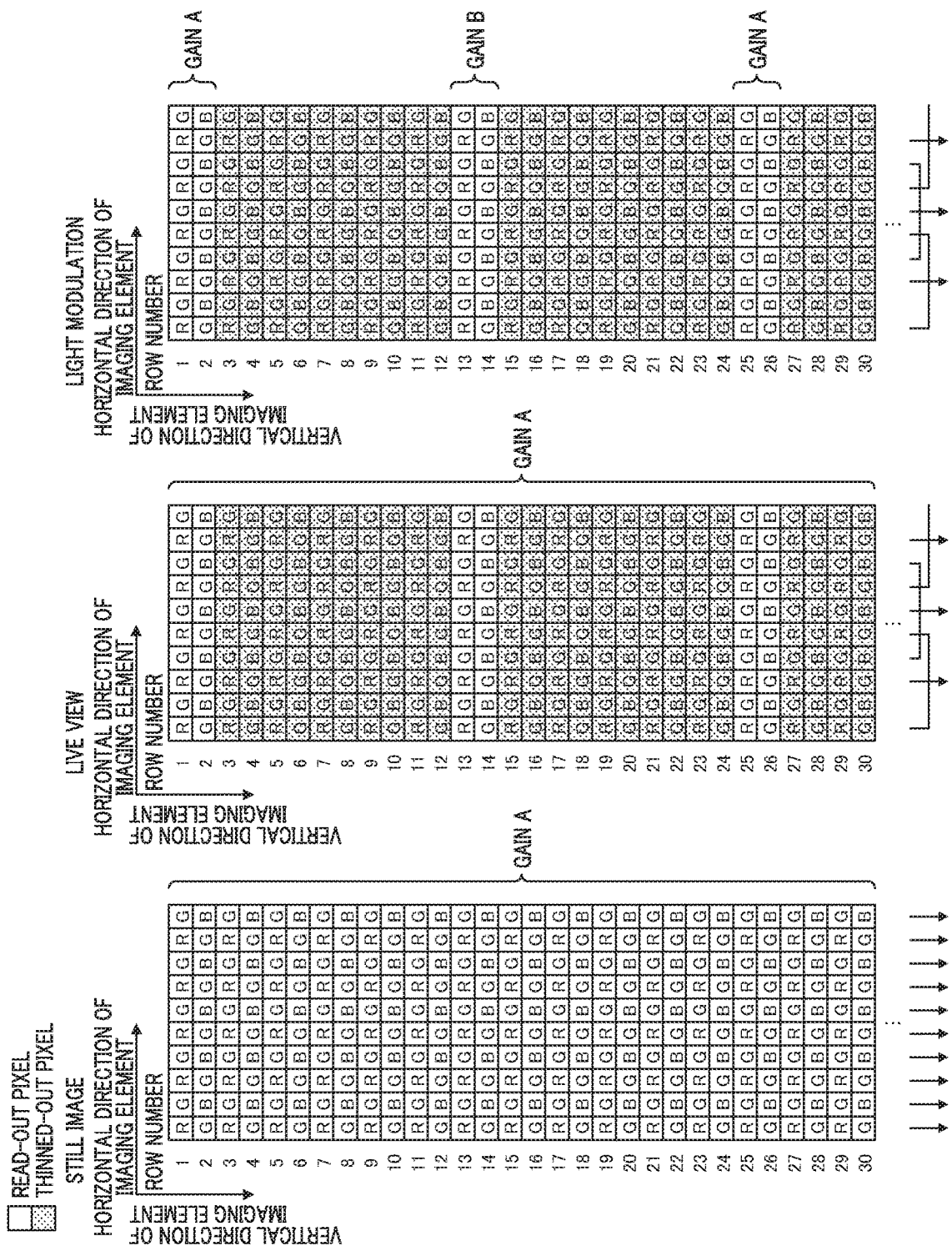

STILL IMAGE

LIVE VIEW

LIGHT MODULATION

TIME →

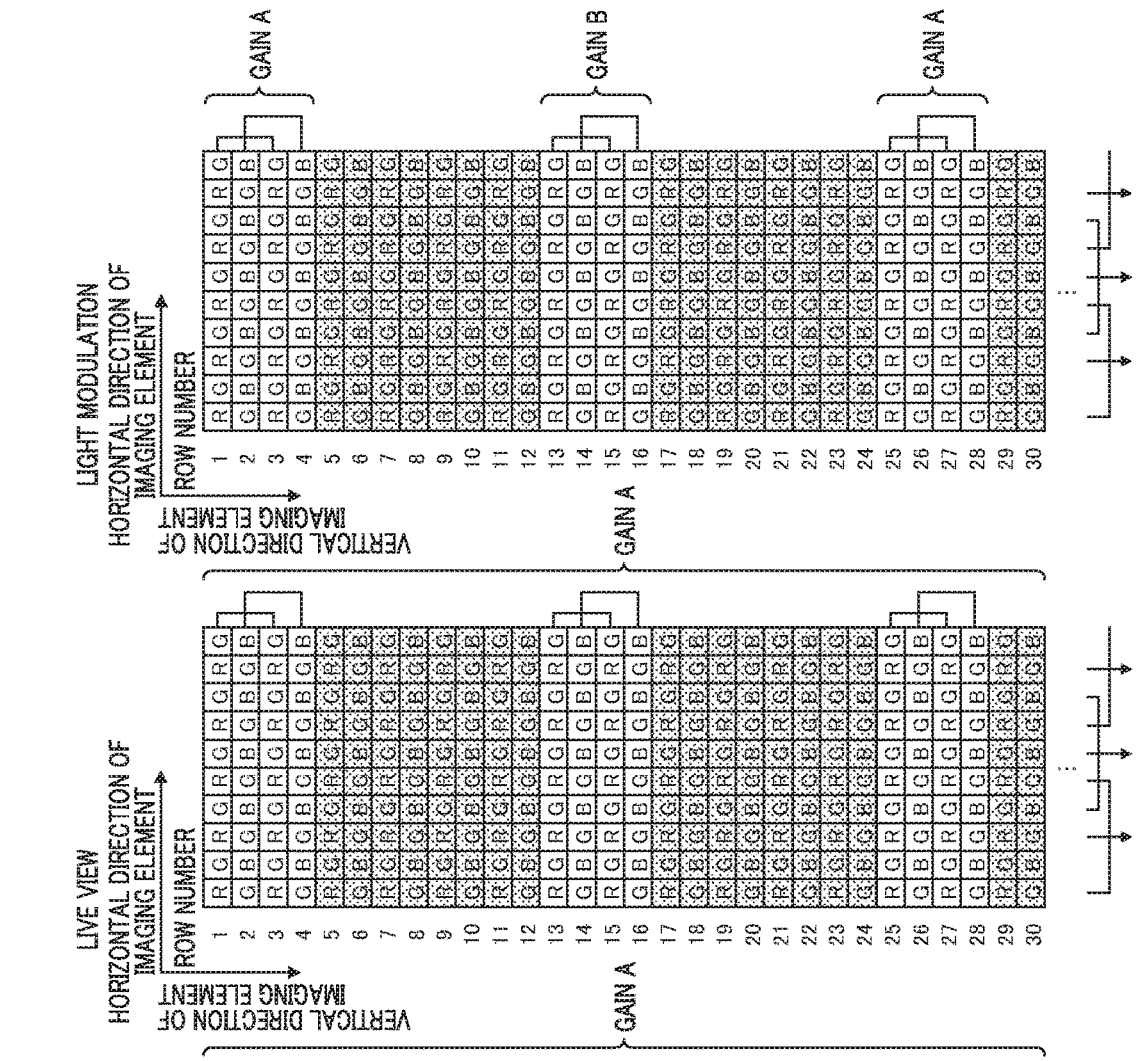

STILL IMAGE

LIVE VIEW

LIGHT MODULATION

TIME ⟶

IMAGING ELEMENT AND METHOD OF CONTROLLING THE SAME, AND IMAGING DEVICE

BACKGROUND OF THE INVENTION

Field of the Invention

The present invention relates to an imaging element capable of reading out multiple rows of pixel signals approximately simultaneously in parallel, a method of controlling the imaging element, and an imaging device using the imaging element.

Description of the Related Art

As photometry schemes for performing exposure control of an imaging device, there are a first scheme for performing photometry using a compression system sensor for photometry and a second scheme for performing photometry using a linear system sensor on an imaging surface or the like. Since the second scheme has a smaller dynamic range (hereinafter also denoted as DR) in which photometry is possible than the first scheme, it is not possible to perform accurate photometry on a subject having a large contrast. Particularly, if flash light modulation for calculating the amount of light emission during image capturing is performed by performing preliminary light emission in image capturing with flashing to perform photometry on reflected light from a subject, the amount of reflected light from a subject varies greatly depending on an image capturing scene. For this reason, if an exposure result during preliminary light emission does not fall within the dynamic range of a linear system sensor, a so-called loss of dark detail or pixel saturation occurs, and thus it may not be possible to accurately perform photometry in a single exposure.

As a technique for coping with the aforementioned problem, in a technique disclosed in Japanese Patent Laid-Open No. 2014-222899, image signals to which multiple types of different gains are applied can be acquired on the occasion of a single readout of pixel signals from a pixel array. Thereby, DR enlargement of image signal output obtained by a single exposure can be achieved.

In addition, there is a technique in which, in order to increase the speed of reading out image signals of one frame from an imaging element, a plurality of vertical signal lines are included in a unit pixel column, and multiple rows of pixel signals are read out in parallel for every unit horizontal synchronizing signal. For example, an imaging element in which one vertical signal line is formed in a pixel array of 1,000 rows as pixel rows is assumed. When image signals of one frame are read out, 1,000 unit horizontal synchronizing signals are required. On the other hand, in an imaging element configured to have ten vertical signal lines with respect to 1,000 rows, ten rows of pixel signals can be read out in parallel for every unit horizontal synchronizing signal. That is, since image signals of one frame are read out using 100 unit horizontal synchronizing signals, it is possible to realize a tenfold readout speed.

In the related art disclosed in Japanese Patent Laid-Open No. 2014-222899, mention is not made of an imaging element configured to read out multiple rows of image signals in parallel for every unit horizontal synchronizing signal. Generally, a plurality of pixel rows which are read out for every unit horizontal synchronizing signal are read out in the same gain. The related art disclosed in Japanese Patent Laid-Open No. 2014-222899 shows an example in which a gain is switched in two-row units and with a four-row period. However, in the case of the above-described configuration in which ten rows of pixel signals are read out in parallel for every unit horizontal synchronizing signal, a gain is switched in ten-row units and with a twenty-row period. When attention is focused on a signal of an image by which one gain is multiplied, a vertical resolution deteriorates. Since it is necessary to increase the number of pixel rows to be read out in parallel in order to achieve a further increase in speed, and the switching period of a gain becomes longer, it is not possible to perform photometry having good accuracy in the viewpoint of a spatial resolution.

SUMMARY OF THE INVENTION

According to an embodiment of the present invention, there is provided an imaging element capable of reading out a plurality of rows of pixel signals in parallel for each horizontal synchronizing signal from pixel groups constituted by unit pixels having a photoelectric converter, the imaging element including a controller configured to perform readout control by multiplying gains by pixel signals of a first pixel group controlled by a first row control signal and pixel signals of a second pixel group controlled by a second row control signal among the pixel groups. The first and second pixel groups are periodically arranged in a first direction of the imaging element, and the controller performs control for multiplying a first gain by the pixel signals of the first pixel group and multiplying a second gain by the pixel signals of the second pixel group.

Further features of the present invention will become apparent from the following description of exemplary embodiments with reference to the attached drawings.

BRIEF DESCRIPTION OF THE DRAWINGS

FIGS. 10A to 10C are diagrams illustrating a signal readout method of the imaging element according to the first embodiment.

FIGS. 15A to 15C are diagrams illustrating a signal readout method of the imaging element according to the third embodiment.

DESCRIPTION OF THE EMBODIMENTS

Hereinafter, preferable embodiments of the present invention will be described with reference to the accompanying drawings. Each embodiment shows an example of an imaging device that performs photometry and flash light modulation based on output of an imaging element in accordance with a second scheme.

First Embodiment

Figure 1:
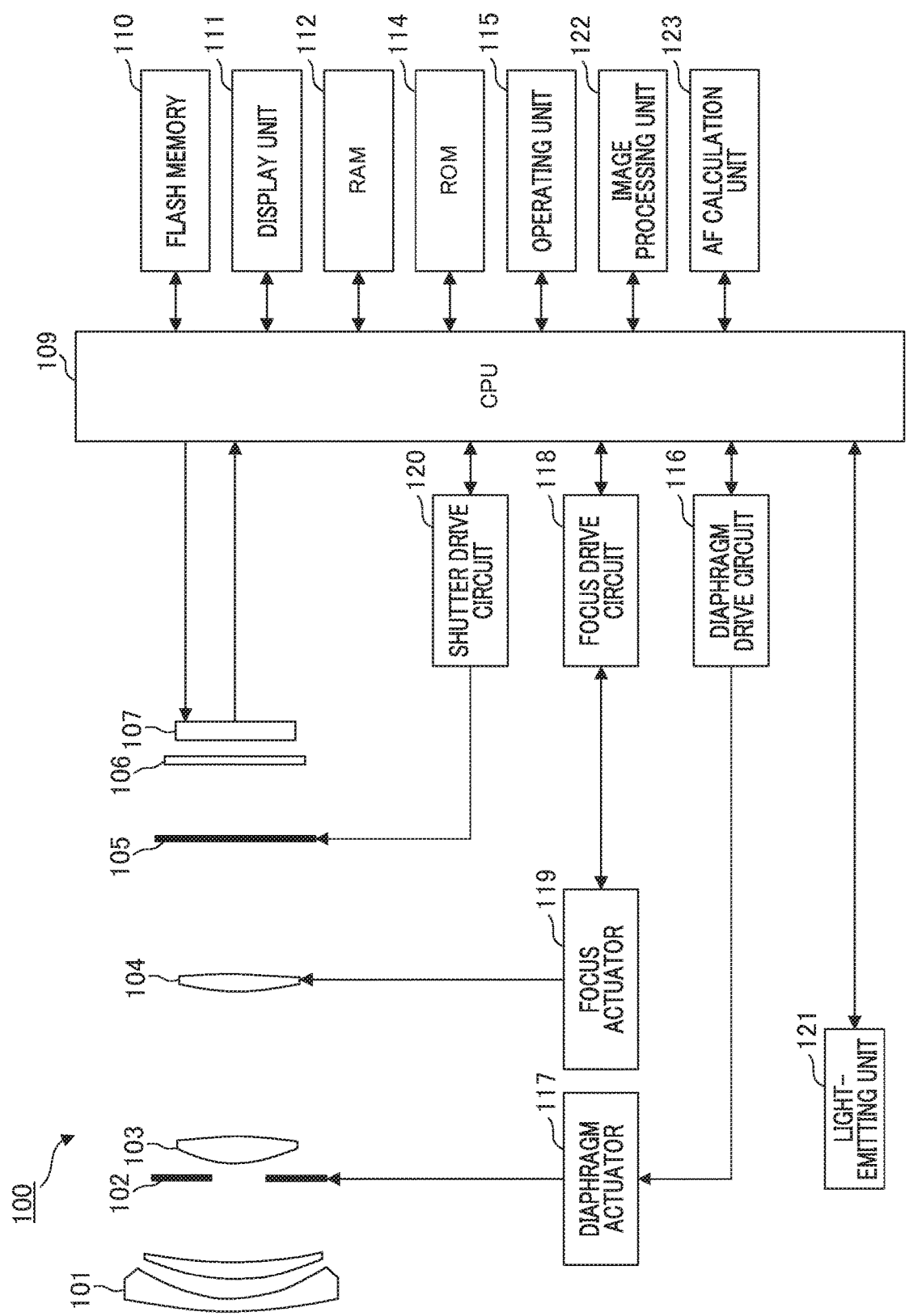
FIG. 1 is an overall configuration diagram an imaging device according to an embodiment of the present invention.

FIG. 1 is a diagram illustrating an overall configuration of an imaging device 100 according to an embodiment of the present invention. Hereinafter, positional relationships between units will be described with a subject side defined as a front side. A first lens group 101 is a lens group which is arranged on the front end side of an imaging optical system, and is retractably held by a lens barrel in an optical axis direction. A diaphragm 102 is an optical member that adjusts the amount of light during image capturing by adjusting its opening diameter, and is located between the first lens group 101 and a second lens group 103. The second lens group 103 is formed integrally with the diaphragm 102 and advances and retracts in the optical axis direction. The second lens group 103 is a lens group having a variable magnification action (a zoom function) in conjunction with the advancing and retracting operation of the first lens group 101. A third lens group 104 is a lens group that performs focusing by advancing and retracting in the optical axis direction, and is located behind the second lens group 103. In the present embodiment, an example of an imaging optical system (image-forming optical system) constituted by the first to third lens groups is shown, but the number of lens groups is not limited, and each lens group may consist of one lens.

A focal plane shutter 105 adjusts the number of seconds of an exposure time during capturing of a still image. Meanwhile, without being limited to the focal plane shutter 105, the number of seconds of an exposure time may be configured to be adjusted at a control pulse using an electronic shutter function of an imaging element 107. For example, in electronic front curtain control, after front curtain traveling based on reset scanning, rear curtain traveling of the focal plane shutter 105 is performed. An optical low-pass filter 106 is an optical element for reducing the false color or moire of a captured image.

The imaging element 107 is used in capturing of a still image and a moving image, and converts an optical image which is formed by the imaging optical system into an electrical signal. A complementary metal oxide semiconductor (CMOS) image sensor of a Bayer array is used in the imaging element 107 of the present embodiment. The imaging element 107 is driven in accordance with a control signal from a central processing unit (CPU) 109, and image data which is output by the imaging element 107 is sent to the CPU 109.

The CPU 109 performs overall control of the imaging device 100. The CPU 109 controls a focus drive circuit 118 and a diaphragm drive circuit 116. For example, the CPU 109 drives and controls a focus actuator 119 through the focus drive circuit 118 on the basis of a focus detection result (detection information) of an autofocus (AF) calculation unit 123. Thereby, the third lens group 104 advances and retracts in the optical axis direction and a focusing operation is performed. In addition, the CPU 109 drives and controls a diaphragm actuator 117 through the diaphragm drive circuit 116, and controls the opening diameter of the diaphragm 102. Furthermore, the CPU 109 controls a zoom drive circuit (not shown) or the like.

A flash memory 110 is connected to the CPU 109, and records still image data and moving image data after image capturing. The flash memory 110 is an example of a memory device capable of being attached to and detached from the imaging device 100. As other recording media, a data writable non-volatile memory, a hard disk, or the like may be used, or a form in which a recording medium is built into a case may be used.

A display unit 111 displays a still image or a moving image (a live view image) which is captured, a menu, or the like in accordance with control commands of the CPU 109. The display unit 111 includes a thin-film transistor (TFT)-type liquid crystal display provided on the back side of the main body of the imaging device 100, a display device of a viewfinder, or the like.

A random access memory (RAM) 112 stores image data which is output from the imaging element 107 or data processed by an image processing unit 122 to be described later. The RAM 112 functions as an image data storage unit for storing image data processed by the image processing unit 122, and has a function as a work memory of the CPU 109. In the present embodiment, an example in which the RAM 112 having a plurality of functions is mounted is shown, but in a case where a memory having a sufficient level of access speed is used, other memories can be used. A read only memory (ROM) 114 is a memory device such as a flash ROM that stores a program which is analyzed and executed by the CPU 109.

An operating unit 115 includes switches which are operated by a shutter release button, a moving image capturing button or the like, and an operating device such as a touch panel provided on a display screen. The operating unit 115 outputs a photographer's image capturing instruction or an instruction signal of a setting operation of imaging conditions or the like to the CPU 109.

A light-emitting unit 121 emits light in accordance with a control command from the CPU 109 during image capturing with flashing. The light source of the light-emitting unit 121 is a xenon lamp, a light-emitting diode (LED), or the like. The light-emitting unit 121 is a light-emitting unit of a flash unit installed on the main body of the imaging device 100, or a light-emitting unit of an external flash device which is mounted and connected to the main body.

The image processing unit 122 performs a process such as correction or compression of an image captured by the imaging element 107. Data processed by the image processing unit 122 is output to the CPU 109. The AF calculation unit 123 performs calculation for focus detection on the basis of a signal acquired by the imaging element 107, and outputs focus detection information to the CPU 109.

Figure 2:
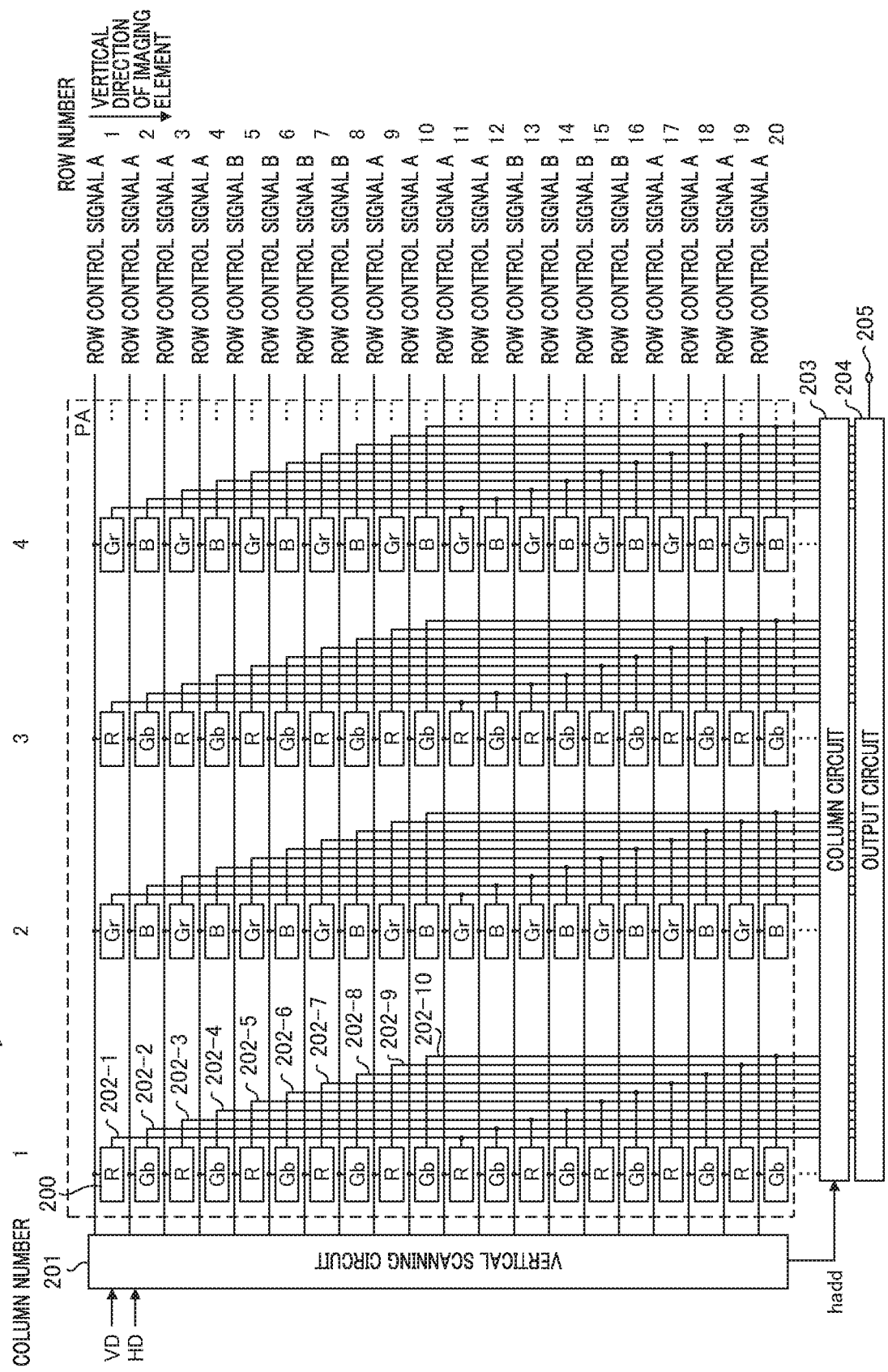
FIG. 2 is a schematic diagram illustrating an overall configuration of an imaging element according to a first embodiment of the present invention.

FIG. 2 is a diagram illustrating an overall configuration of the imaging element 107. In a pixel area PA, a large number of unit pixels 200 are arranged in a matrix. On the upper end of FIG. 2, column numbers 1 to 4 are displayed in the horizontal direction (column direction) of the imaging element, and on the right end of FIG. 2, row numbers 1 to 20 are displayed in the vertical direction (row direction) of the imaging element. The present embodiment shows an example in which, in the vertical direction of the imaging element, a first pixel group controlled by a first row control signal and a second pixel group controlled by a second row control signal are arranged with periods corresponding to an even number of rows.

The imaging element 107 has ten vertical signal lines 202-1 to 202-10 to a pixel column, and is configured such that any one of the vertical signal lines 202-1 to 202-10 is connected to each pixel with a ten-row period. The vertical signal line is an interconnection for transferring a pixel signal of a connected unit pixel 200 to a latter-stage column circuit. A vertical scanning circuit 201 is a circuit that outputs a signal for driving a unit pixel 200. The vertical scanning circuit 201 outputs a row control signal in synchronization with a frame synchronizing signal VD and a horizontal synchronizing signal HD which are input from the CPU 109. The details of the row control signal will be described later. The frame synchronizing signal VD is a signal synchronized with the start of readout of a screen. The horizontal synchronizing signal HD is a signal synchronized with a unit horizontal control period.

In the imaging element 107 of the present embodiment, ten rows of pixel signals to every horizontal synchronizing signal are temporally read out in parallel. The vertical signal lines are connected to a column circuit 203, and the column circuit 203 includes a constant current source that drives the vertical signal lines and an analog-digital (AD) conversion circuit that converts a pixel signal which is an analog signal to a digital signal. In addition, there may be a resolution close to the resolution of the display unit 111 mainly during live view driving. In a case where the resolution of the imaging element 107 is higher than the display resolution of the display unit 111, the number of pixels is reduced inside the imaging element and readout is performed. Thereby, power saving can be realized by saving power by a decrease in a readout time due to the realization of a high frame rate or a reduction in the number of pixels.

The column circuit 203 further includes an addition averaging circuit that performs addition averaging on signals of the same color in a horizontal direction in order to reduce the number of pixels in a horizontal direction. This addition averaging is controlled by a signal hadd which is output from the vertical scanning circuit 201 to the column circuit 203. When the signal hadd is at a high level, the addition averaging is performed. A digital signal converted by the column circuit 203 is input to an output circuit 204, and various types of signal processing are performed in the output circuit 204. Thereafter, a signal is output from an output terminal 205.

Figure 3:
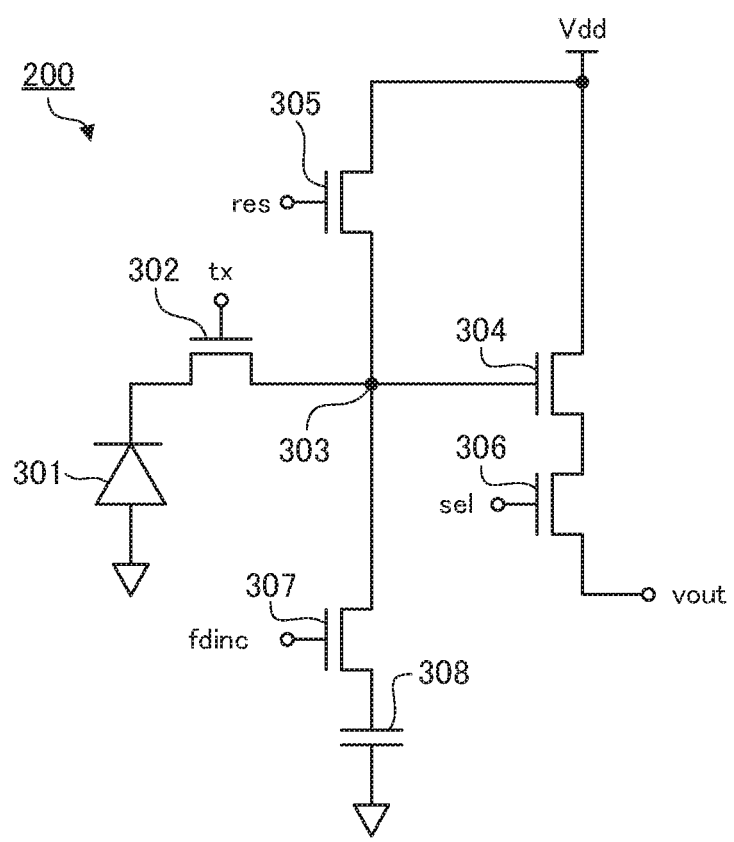
FIG. 3 is a diagram illustrating a circuit configuration of one pixel of the imaging element according to the first embodiment.

The configuration of a pixel will be described with reference to FIG. 3. FIG. 3 is a circuit diagram illustrating a configuration example of one unit pixel 200. A photodiode (hereinafter denoted as a PD) 301 constituting a photoelectric conversion unit receives incident light to perform photoelectric conversion on a light image, and accumulates charge according to the amount of the incident light.

A transfer gate 302 transfers charge accumulated in the PD 301 by setting a signal tx to be at a high level to a floating diffusion (hereinafter abbreviated as FD) portion 303. The FD portion 303 has a function of converting charge generated in the PD 301 and transferred by the transfer gate 302 into a voltage, and is connected to the gate of an FD amplifier 304. The FD amplifier 304 amplifies the voltage of the FD portion 303 together with the constant current source of the column circuit 203 and transfers the amplified voltage to the vertical signal lines.

An FDinc switching element 307 connects an additional capacitor 308 to the FD portion 303 by setting a signal fdinc to be at a high level. In addition, the signal fdinc is set to be at a low level, so that the additional capacitor 308 is not connected to the FD portion 303. Thereby, a capacity occurring in the FD portion 303 changes. In other words, the FDinc switching element 307 and the additional capacitor 308 function as a capacity variable unit configured to make the capacity value of an input node variable. In this case, it is possible to switch the conversion ratio of the output voltage of the FD amplifier 304 to the charge transferred to the FD portion 303, that is, a gain. In a case where the additional capacitor 308 is connected to the FD portion 303, and a synthetic capacity value increases, a gain becomes smaller than in the case of a non-connection state. On the contrary, if the additional capacitor 308 is not connected to the FD portion 303, the synthetic capacity value returns to the capacity value of only the FD portion 303, and a gain becomes larger than in a connection state. In this manner, the imaging device of the present embodiment variably controls the amount of charges held by a capacitor unit in accordance with the signal fdinc, and can switch the gain of a unit pixel 200. The gain is set as a gain A if the signal fdinc is at a high level, and the gain is set as a gain B if the signal is at a low level (A<B).

An FD reset switching element 305 is a switching element for reset connected to the FD portion 303. The FD reset switching element 305 resets the FD portion 303 by setting a signal res to be at a high level. In addition, the signal tx and the signal res are controlled to a high level at the same time, and both the transfer gate 302 and the FD reset switching element 305 are turned on, so that the PD 301 is reset through the FD portion 303.

A pixel selection switching element 306 outputs a pixel signal converted into a voltage in the FD amplifier 304 by setting a signal sel to be at a high level. This pixel signal is output to the vertical signal lines as an output vout of a unit pixel 200.

Figure 4:
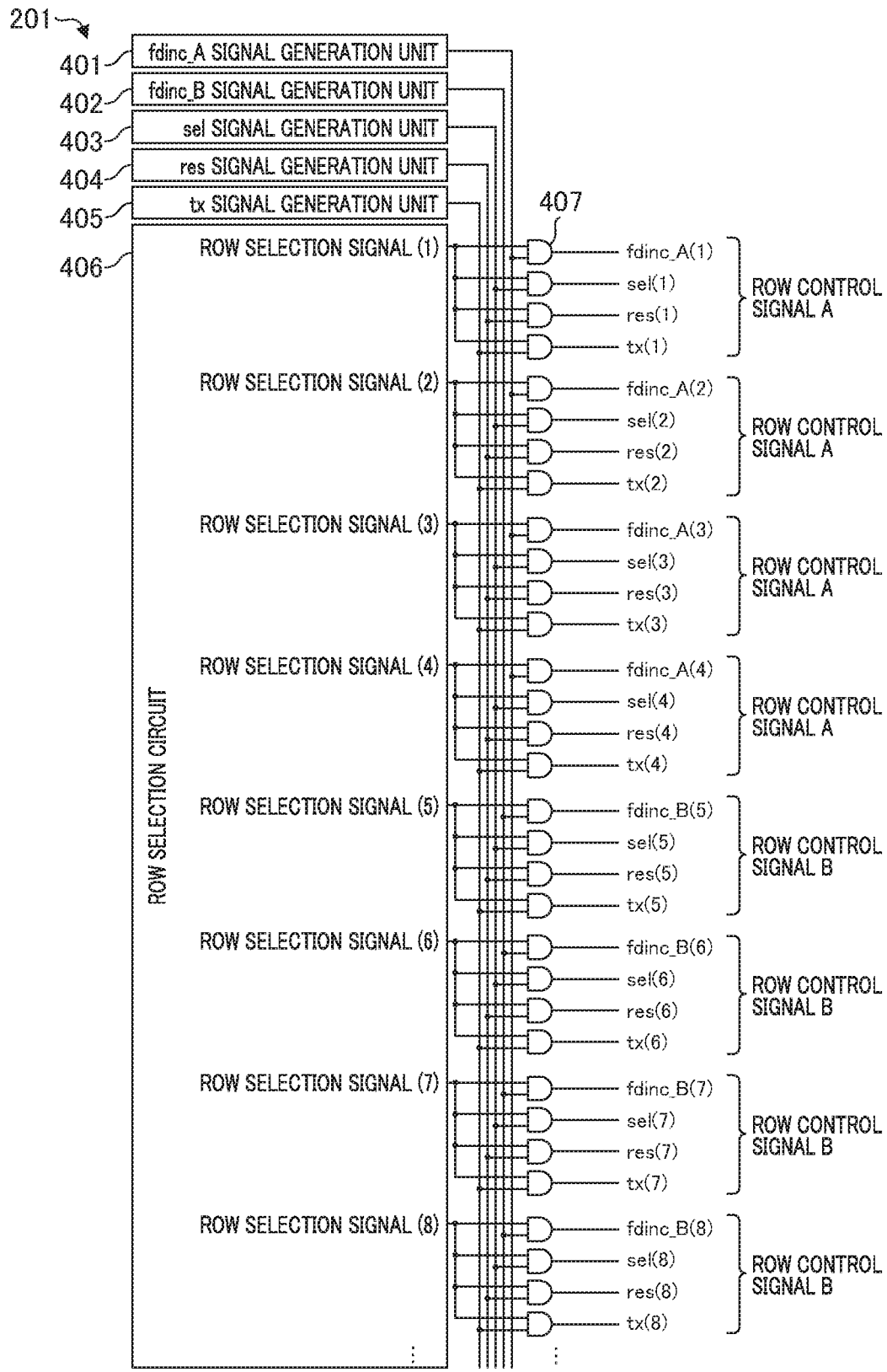
FIG. 4 is a diagram illustrating a circuit configuration of a vertical scanning circuit of the imaging element according to the first embodiment.

In the present specification, the signals tx, res, sel, and fdinc for controlling a unit pixel 200 are collectively referred to as the row control signal. The row control signal will be described with reference to FIGS. 2 and 4. FIG. 4 shows the internal configuration of the vertical scanning circuit 201, and numerals within parentheses in the drawing show corresponding row numbers. The vertical scanning circuit 201 includes signal generation units 401 to 405 that generate each row control signal and a row selection circuit 406 that outputs a signal for selecting a pixel row. Row selection signals which are output by the row selection circuit 406 and signals which are generated and output by the signal generation units 401 to 405 are input to a plurality of AND circuits 407. The AND circuits 407 perform a logical AND operation to output the row control signals to the pixel units of the respective rows.

The row control signals are classified into two kinds of signals, and are distinctively shown by a row control signal A and a row control signal B. On the right in FIG. 2, row numbers and row control signals are shown from the top down in the vertical direction of the imaging element 107. For example, corresponding to row numbers 1, 2, 3, 4, 5, 6, 7, 8, 9 . . . , the row control signals are periodically repeated as A, A, A, A, B, B, B, B, A, A, A, A, B, B, B, B, . . . . That is, the row control signal A and the row control signal B are switched with an eight-row period in a pixel array. In addition, as shown in FIG. 4, in the row control signal A and the row control signal B, the signals sel, res, and tx among the row control signals are a common signal. Only fdinc can be individually controlled in the row control signal A and the row control signal B. Meanwhile, fdinc_A indicates a signal fdinc corresponding to the row control signal A, and fdinc_B indicates a signal fdinc corresponding to the row control signal B. For example, regarding the row control signal A of a first row shown in FIG. 4, a signal from the fdinc_A signal generation unit 401 and a row selection signal (1) are input to an AND circuit 407. Signals from the signal generation units 403 to 405 and the row selection signal (1) are input to a plurality of other AND circuits 407. The AND circuits 407 output signals fdinc_A(1), sel(1), res(1), and tx(1). In addition, regarding the row control signal B of a fifth row, signals from the fdinc_B signal generation unit 402 and a row selection signal (5) are input to an AND circuit 407. The signals from the signal generation units 403 to 405 and the row selection signal (5) are input to a plurality of other AND circuits 407. The AND circuits 407 output signals fdinc_B (5), sel(5), res(5), and tx(5).

In the present embodiment, a gain can be switched by making the signals fdinc different from each other in the row control signal A and the row control signal B. That is, a gain can be switched in rows to which the row control signal A is input and rows to which the row control signal B is input among ten rows which are temporally read out in parallel within one horizontal synchronous period. In addition, if the signals fdinc are set as the same signal in the row control signal A and the row control signal B, it is also possible to perform signal readout with the same gain in all the rows. With such a configuration, it is possible to realize an increase in the speed of signal readout in one screen, and to determine a period in which a gain is switched irrespective of the number of rows read out within one horizontal synchronous period. In this case, since light modulation image data requires a dynamic range corresponding to each color, it is preferable to switch a gain in a Bayer unit. Therefore, it is suitable to switch a gain with a period of an even number of two or more rows.

Figure 7:
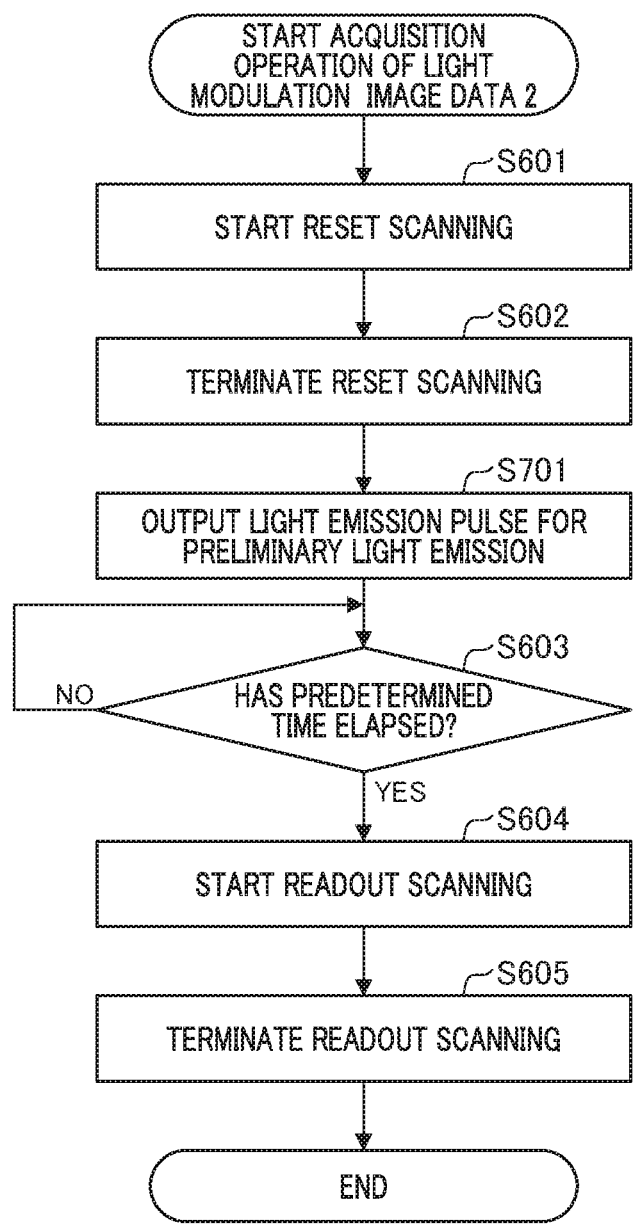
FIG. 7 is a flow chart illustrating an acquisition operation of light modulation image data 2 according to the first embodiment.
Figure 8:
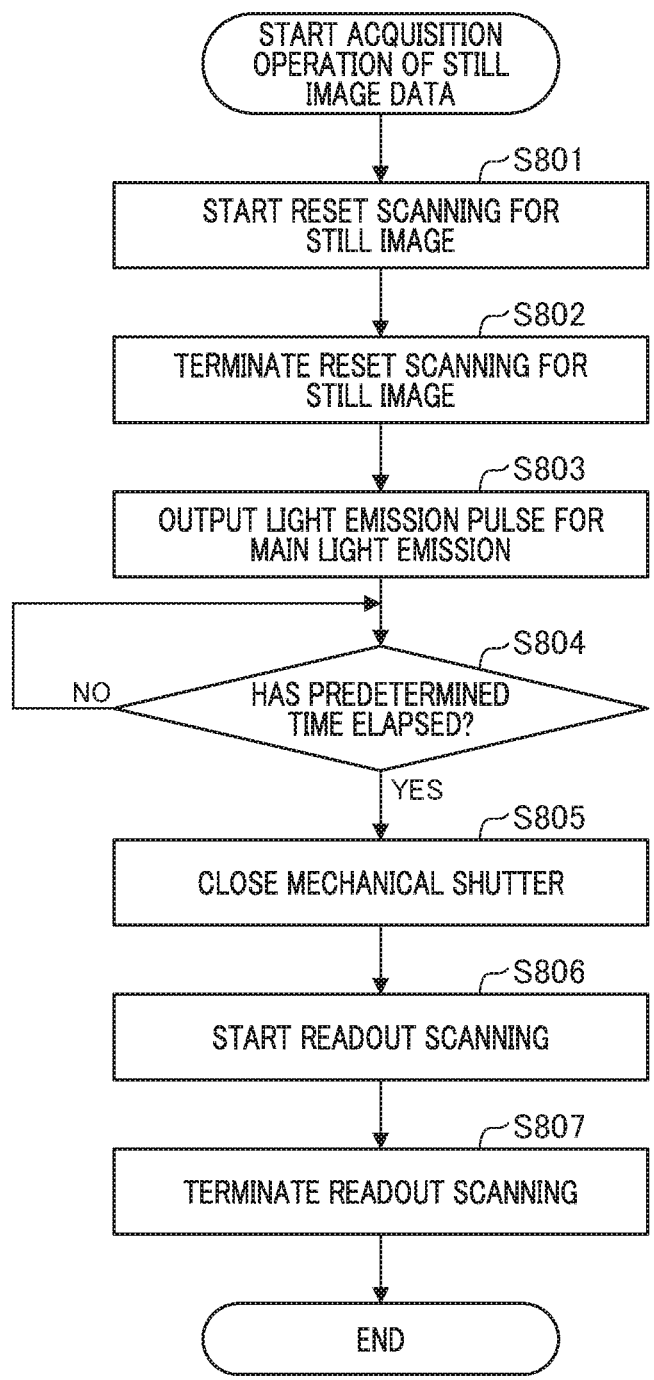
FIG. 8 is a flow chart illustrating an acquisition operation of still image data according to the first embodiment.
Figure 9:
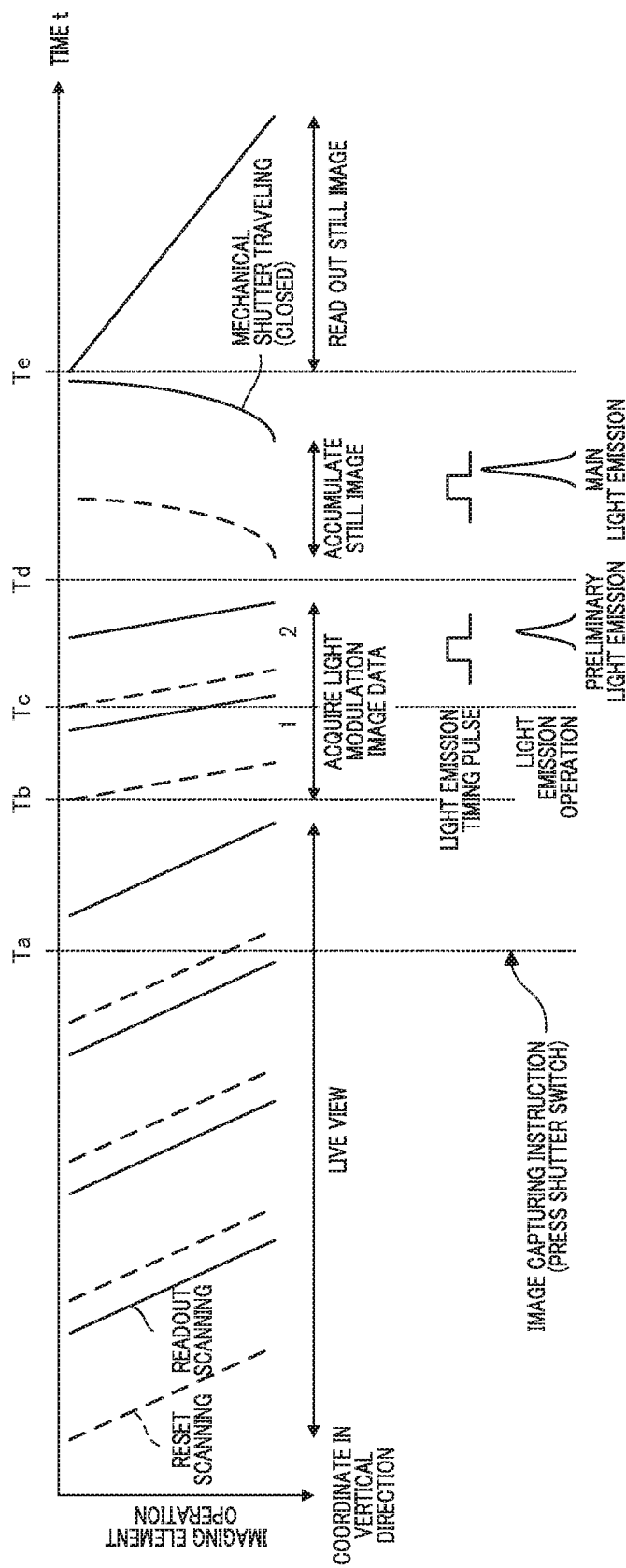
FIG. 9 is a sequence diagram illustrating an imaging operation according to the first embodiment.

Next, the imaging operation of the imaging device 100 according to the present embodiment will be described with reference to FIGS. 5 to 9. FIGS. 5 to 8 are flow charts illustrating processes. FIG. 9 is a sequence diagram of an imaging operation. The horizontal axis of FIG. 9 represents a time axis, and the vertical axis represents coordinates of the imaging element in a vertical direction. In FIG. 9, reset scanning of the imaging element and readout scanning of a signal are represented by oblique lines, and the reset scanning represented by dotted lines and the readout scanning represented by solid lines are distinguished from each other. In addition, a reset operation in an electronic front curtain operation is represented by dotted lines, and traveling (closing operation) of a mechanical shutter which is a rear curtain is represented by solid lines.

Figure 5:
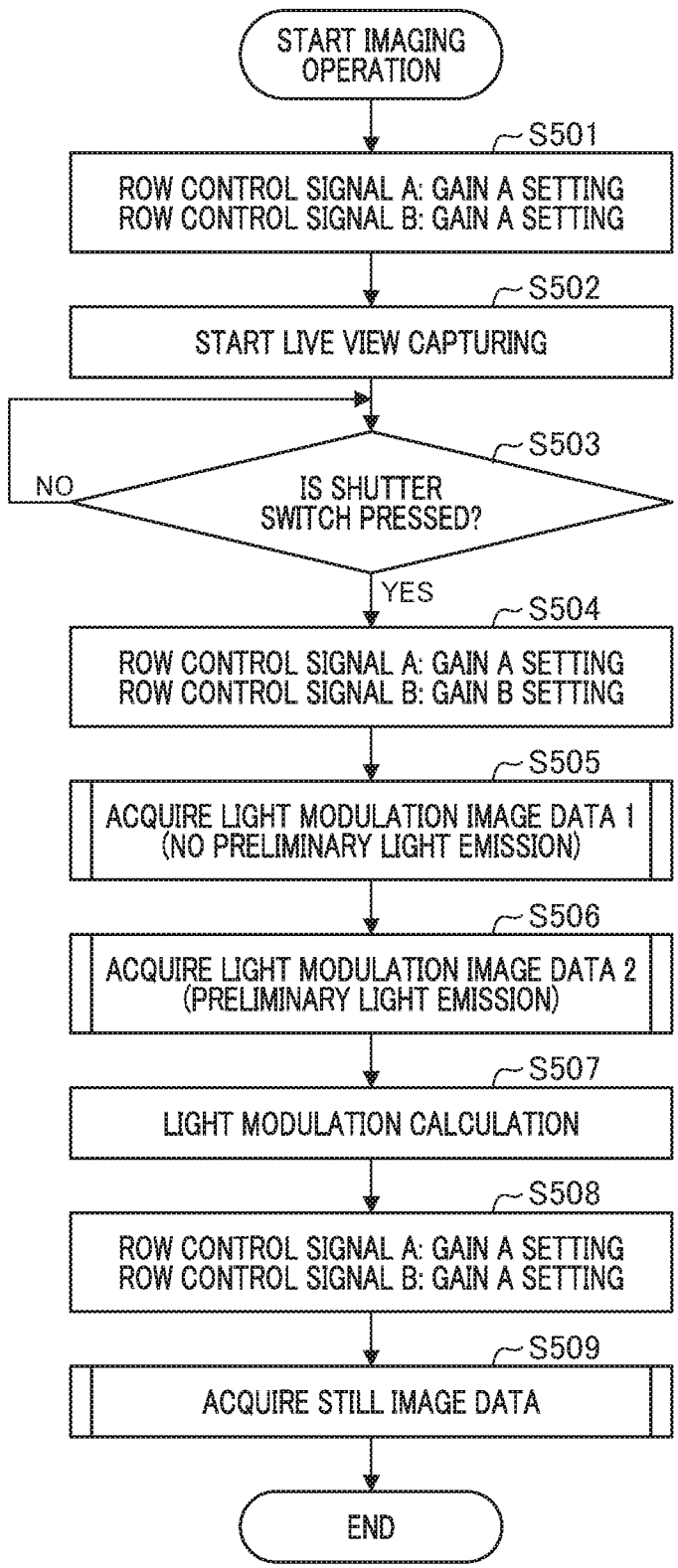
FIG. 5 is a flow chart illustrating an imaging operation according to the first embodiment.

First, in S501 of FIG. 5, gain setting relating to a row control signal is performed by control of the CPU 109 prior to the start of live view capturing performed in S502. The signals fdinc in the row control signal A and the row control signal B are all set to be at a high level, and a setting process of performing signal readout with the same gain A is executed with respect to all the rows. In the next step S502, the CPU 109 starts live view (hereinafter also denoted as LV) capturing. In LV capturing, images based on image data continuously acquired by the imaging operation of the imaging element 107 are sequentially displayed on the screen of the display unit 111.

In S503, the CPU 109 determines whether a shutter release button included in the operating unit 115 is pressed by a photographer and a shutter switch is turned on. The CPU 109 continues LV capturing until the shutter switch is turned on. If it is determined in S503 that the photographer presses the shutter release button and performs an image capturing instruction, the flows proceeds to the process of S504. Meanwhile, time Ta shown in FIG. 9 represents a timing of the image capturing instruction.

In S504, gain setting relating to a row control signal is performed by control of the CPU 109 prior to the acquisition of light modulation image data which is performed in S505. The signal fdinc in the row control signal A is set to be at a high level, and the signal fdinc in the row control signal B is set to be at a low level, so that setting for reading out a signal by performing switching for every two rows with respect to each row read out in the gain A and the gain B is performed.

In the next step S505, the CPU 109 terminates the LV capturing operation of the imaging element 107, and acquires first light modulation image data (hereinafter referred to as light modulation image data 1). Meanwhile, time Tb of FIG. 9 represents a start timing of a light emission operation, and the light modulation image data 1 is acquired in a period from time Tb to time Tc. In order to acquire the light modulation image data 1 in a short time, addition averaging is performed for every three pixels of the same color in a horizontal direction, and a process of reading out a signal by performing thinning-out with a period of two rows to every twelve rows in a vertical direction is executed. The light emission of the light-emitting unit 121 is not performed in the acquisition of the light modulation image data 1. The acquisition operation of the light modulation image data 1 in S505 will be described later with reference to FIG. 6.

In S506, the CPU 109 acquires second light modulation image data (hereinafter referred to as light modulation image data 2). The light modulation image data 2 is acquired in a period from time Tc to time Td. Regarding the light modulation image data 2, similarly to the light modulation image data 1, addition averaging is also performed for every three pixels of the same color in a horizontal direction, and a process of reading out a signal by performing thinning-out with a period of two rows to every twelve rows in a vertical direction is executed. In the acquisition of the light modulation image data 2, the CPU 109 controls the light-emitting unit 121, and performs preliminary light emission with a predetermined amount of light. In the example shown in FIG. 9, the readout scanning (see solid lines) for acquiring the light modulation image data 1 and the reset scanning (see dotted lines) for acquiring the light modulation image data 2 are performed in parallel. Thereby, the acquisition operation of the light modulation image data 1 and a portion of the acquisition operation of the light modulation image data 2 can be overlapped with each other. The acquisition operation of the light modulation image data 2 in S506 will be described later with reference to FIG. 7.

In S507, the CPU 109 performs light modulation calculation for calculating the amount of light emission of the light-emitting unit 121 during still image capturing (hereinafter referred to as the amount of main light emission), and determines the calculated amount of light emission as the amount of main light emission. In the light modulation calculation in S507, reflected light components of preliminary light emission are extracted by comparing the light modulation image data 1 with the light modulation image data 2. The amount of main light emission is calculated on the basis of the extracted reflected light components of preliminary light emission.

In S508, gain setting relating to a row control signal is performed by control of the CPU 109 prior to a process of acquiring still image data which is performed in S509. The signals fdinc in the row control signal A and the row control signal B are all set to be at a high level, and a setting process of performing signal readout with the same gain A with respect to all the rows is executed.

In S509, the CPU 109 causes the light-emitting unit 121 to emit light (main light emission), and performs a process of acquiring still image data. The accumulation operation of a still image is started at time Td of FIG. 9. The main light emission is performed in a period from time Td to time Te and an electronic front curtain operation (a shutter operation) is performed. The main light emission of the light-emitting unit 121 is controlled in accordance with a timing of a predetermined light emission pulse. A readout operation is started from time Te with respect to signal charge of the accumulated still image. After S509, the imaging operation is terminated.

Figure 6:
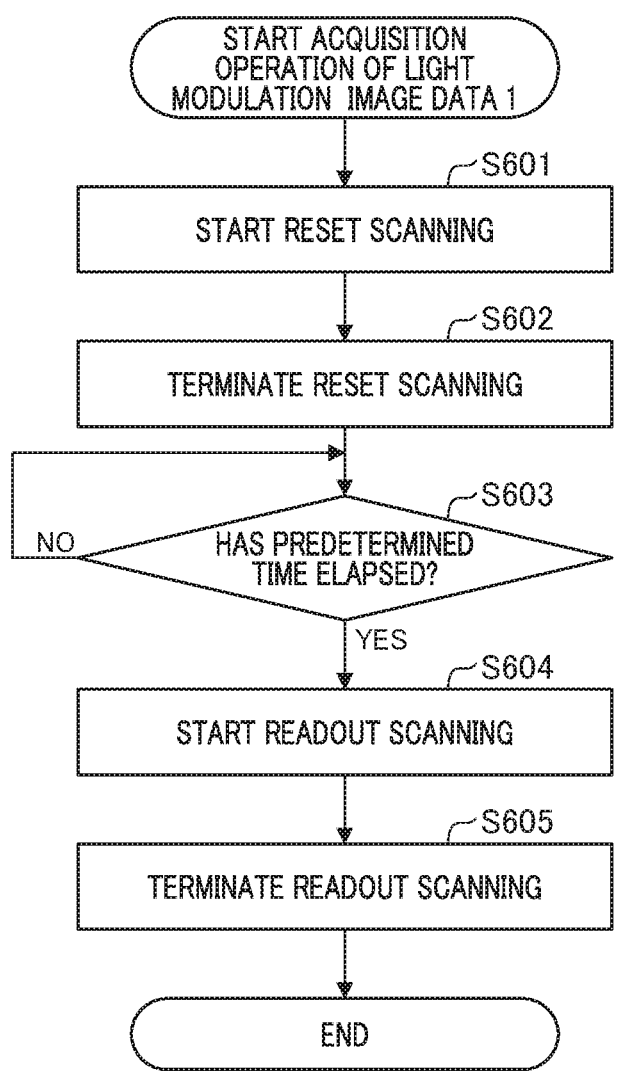
FIG. 6 is a flow chart illustrating an acquisition operation of light modulation image data 1 according to the first embodiment.

Next, the acquisition operation of the light modulation image data 1 shown in S505 of FIG. 5 will be described with reference to FIG. 6. First, the CPU 109 starts the reset scanning in S601, and sequentially resets each pixel row of the imaging element 107. The reset of each pixel row is performed by setting both levels of the signal res and the signal tx to be at a high level through the vertical scanning circuit 201 in FIG. 3.

After the reset scanning of the last pixel row is terminated in S602, the process proceeds to S603. In S603, the CPU 109 stands by until a predetermined accumulation time elapses. If it is determined in S603 that the predetermined accumulation time has elapsed, the CPU 109 advances the process to S604. In S604, the CPU 109 starts the readout scanning of the imaging element 107. If the readout scanning is terminated in S605, the acquisition process of the light modulation image data 1 is completed. Meanwhile, if the predetermined accumulation time is short, the accumulation time of an initial pixel row may elapse before the reset scanning of the last pixel row is terminated. In that case, even before the reset scanning of the last pixel row is terminated, the readout scanning may be started in order from a pixel row in which the predetermined accumulation time has elapsed.

Next, a process of acquiring the light modulation image data 2 shown in S506 of FIG. 5 will be described with reference to FIG. 7. The process of acquiring the light modulation image data 2 is different from the process of acquiring the light modulation image data 1, in that preliminary light emission is performed. Since the processes of S601 to 605 have been described, the process of S701 which is a difference will be described.

After the termination of the reset scanning in S602, the process proceeds to S701, and the CPU 109 outputs a light emission pulse for preliminary light emission to the light-emitting unit 121 and causes the light-emitting unit 121 to emit light. The process proceeds to S603 subsequently to S701, and the readout scanning is started in S604 after preliminary light emission.

In the present embodiment, an example in which a light emission pulse for preliminary light emission is output after the termination of the reset scanning is shown. However, if it takes time from the output of a light emission pulse to the actual light emission of the light-emitting unit 121, a light emission pulse may be output before the completion of the reset scanning in anticipation of its time lag, and the actual preliminary light emission may occur immediately after the completion of the reset scanning. In that case, a light emission pulse may be output at a point in time when a predetermined time has elapsed from the start of the reset scanning in S601.

In addition, similarly to the acquisition process of the light modulation image data 1, even before the reset scanning of all the pixels is terminated, the readout scanning may be started in order from a pixel in which the predetermined accumulation time has elapsed. In this case, it is preferable to continuously perform the preliminary light emission from before the start of the reset scanning of a pixel on which initial reset scanning is performed to the completion of the readout scanning of a pixel signal on which final reset scanning is performed.

After gain setting of S508 in FIG. 5, the acquisition operation of still image data in S509 is performed by control of the CPU 109. Hereinafter, a description will be given with reference to FIGS. 8 and 9. FIG. 8 is a flow chart illustrating an acquisition operation of still image data.

First, the CPU 109 starts reset scanning for a still image in S801 (FIG. 9: time Td). Thereby, charge in each pixel of the imaging element 107 is sequentially cleared for each pixel row. In FIG. 9, the reset scanning for a still image is represented by a dotted curve. This curve has the same shape as a curve represented by a solid line during traveling of a mechanical shutter (a focal plane shutter) for shielding the imaging element 107 from light. Meanwhile, without being limited to this example, an embodiment in which charges of all the pixel rows are simultaneously cleared may be used. However, in that case, since a time from a point in time when charge is cleared to a point in time when light is shielded in the focal plane shutter varies in accordance with pixel rows, an operation in which the amount of exposure varies depending on rows is performed.

The reset scanning for a still image is terminated in S802. Thereafter, in S803, the CPU 109 outputs a light emission pulse for main light emission in order to perform the main light emission for still image capturing, and performs the main light emission of the light-emitting unit 121 at a predetermined timing. In the subsequent step S804, the CPU 109 determines whether an accumulation time equivalent to a set shutter speed has elapsed. If it is determined that the accumulation time has elapsed, the flow proceeds to the process of S805. If it is determined that the accumulation time has not elapsed, the determination process of S804 is repeated.

In S805, the CPU 109 causes the focal plane shutter 105 to travel through a shutter drive circuit 120 (rear curtain traveling), and shields the imaging element 107 from light. The focal plane shutter 105 travels as in a curve represented by a solid line in FIG. 9, and the shutter is closed in S805. Thereafter, in S806, the CPU 109 starts the readout scanning of the imaging element 107 (FIG. 9: time Te). If the readout scanning is terminated in S807, the acquisition process of still image data is completed.

Next, a method of reading out pixel signals of the imaging element 107 will be described with reference to FIGS. 10A to 10C. In FIGS. 10A to 10C, the horizontal direction of the imaging element is defined as a right-left direction, and a vertical direction orthogonal to the direction is defined as an up-down direction. A rectangular frame in which any of R, G, and B is written in FIGS. 10A to 10C indicates a unit pixel, and R (red), G (green), and B (blue) each indicate colors of a color filter. In addition, a rectangular frame shown in white indicates a readout pixel, and a rectangular frame with a textured pattern indicates a thinned-out pixel in which a signal is not read out.

FIG. 10A is a diagram illustrating a method of reading out pixel signals of the imaging element 107 in an operating mode during still image capturing. In still image capturing, a process of independently reading out signals of all the pixels from the imaging element 107 in a common gain is executed. That is, a setting is performed to output the same signal to the row control signal A and the row control signal B. Here, an example in which signals are read out in the gain A with the FDinc switching element 307 turned on in all the pixels is shown. In an initial horizontal synchronous period during still image capturing, signals of pixel groups belonging to ten rows of row numbers 1 to 10 which are connected to different vertical signal lines are read out in parallel. In the next horizontal synchronous period, signals of pixel groups belonging to ten rows of row numbers 11 to 20 are read out in parallel. Thereafter, signals of all the pixels unit are read out similarly.

FIG. 10B is a diagram illustrating a method of reading out pixels of the imaging element 107 in an operating mode during live view capturing. In LV capturing, the number of readout pixels is restricted by performing the addition or thinning readout of pixel signals in order to secure a frame rate. Here, an example in which addition averaging is performed for every three pixels of the same color in a horizontal direction and thinning readout is performed with a period of two rows to every twelve rows in a vertical direction is shown. A combination of pixels in which addition averaging in a horizontal direction is performed is shown in the lower part of FIG. 10B. A setting is performed to output the same signal to the row control signal A and the row control signal B. Here, similarly to the still image capturing, an example in which signals are read out in the gain A is shown. In an initial horizontal synchronous period during LV capturing, signals of pixel groups belonging to ten rows of row numbers 1, 2, 13, 14, 25, 26, ..., 49, 50 which are connected to different vertical signal lines are read out in parallel. In the next horizontal synchronous period, signals of pixel groups belonging to ten rows of row numbers 51, 52, 63, 64, 75, 76, ..., 99, 100 are read out in parallel. Thereafter, similarly, signals of a pixel unit are read out.

FIG. 10C is a diagram illustrating a signal readout method of the imaging element 107 in an operating mode during the acquisition of the light modulation image data 1 and the light modulation image data 2. Here, similarly to the LV capturing, an example in which addition averaging is performed for every three pixels of the same color in a horizontal direction and thinning readout is performed with a period of two rows to every twelve rows in a vertical direction is shown. The signal fdinc of the row control signal A in an initial horizontal synchronous period is set to be at a high level, and the signal fdinc of the row control signal B is set to be at a low level. The signal fdinc of the row control signal A in the next horizontal synchronous period is set to be at a low level, and the signal fdinc of the row control signal B is set to be at a high level. Through control of such a setting, signals are alternately read out in the gain A and the gain B for every two rows of rows in which thinning readout is performed with a period of two rows to every twelve rows in a vertical direction. That is, it is possible to read out signals by which two different kinds of gains are multiplied on the occasion of a single readout of pixel signals.

Signal readout operations of the imaging element 107 will be described with reference to timing diagrams of FIGS. 11A to 11C. Each signal has been described, and "H" or "L" written on the right side of a signal name indicates the initial state of each signal. "H" indicates a high level, and "L" indicates a low level.

Figure 11A:
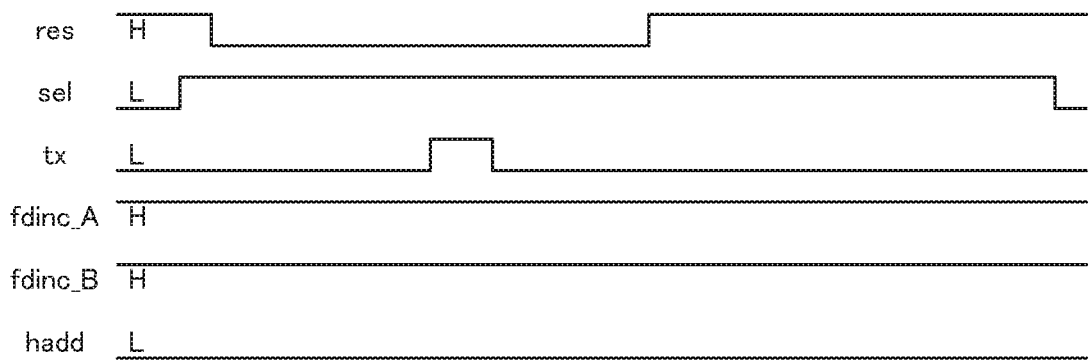
FIGS. 11A to 11C are timing diagrams illustrating signal readout operations at 1H of the imaging element according to the first embodiment.

FIG. 11A is a timing diagram illustrating a signal readout operation of the imaging element 107 in one horizontal synchronous period when a still image signal is acquired in the gain A with respect to all the pixels. In this case, a setting is performed to read out signals of all the pixels in the gain A, and signals fdinc_A and fdinc_B are set to be at a high level during a readout period. In addition, since addition averaging in a horizontal direction performed by the column circuit 203 is not performed during still image capturing, a signal hadd is set to be at a low level.

A signal sel shown in FIG. 11A is set to be at a high level, and the pixel selection switching element 306 is turned on. Thereafter, the signal res is set to be at a low level, the FD reset switching element 305 is turned off, and the reset of the FD portion 303 is released. In this case, reset noise appears in the potential of the FD portion 303. The reset noise is input to the column circuit 203 through the pixel selection switching element 306 and a vertical signal line 202 and is held. Thereafter, the signal tx is set to be at a high level, and the transfer gate 302 is turned on. A signal accumulated in the PD 301 of a selected row is transferred to the FD portion 303 through this operation, and a signal to which the reset noise and the accumulated signal are added is held in the FD portion 303. The signal to which the reset noise and the accumulated signal are added is input to the column circuit 203 through the FD amplifier 304, the pixel selection switching element 306, and the vertical signal line 202 and is held. Thereafter, the column circuit 203 extracts only signal components by performing a process of subtracting the reset noise from the signal to which the reset noise and the accumulated signal are added, and then outputs signals sequentially in terms of columns from the output circuit 204. As stated above, a readout operation of one row is terminated. This operation is sequentially performed on readout target rows, so that the signal readout operation of the imaging element 107 is performed.

Figure 11B:
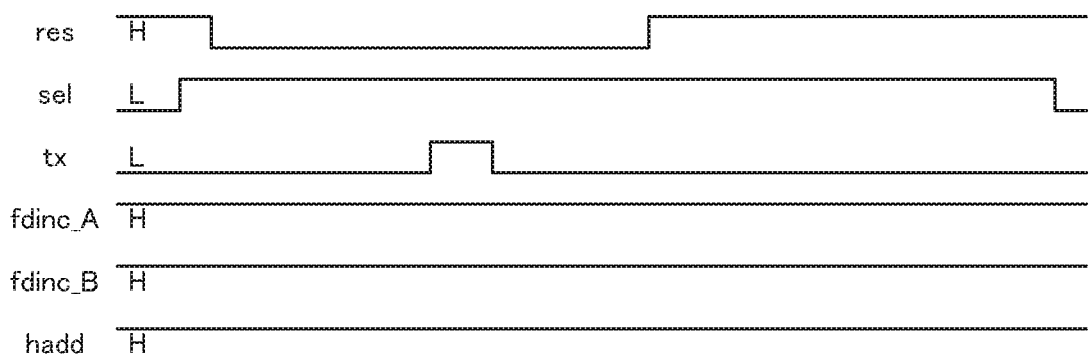

FIG. 11B is a timing diagram illustrating a signal readout operation of the imaging element 107 during LV capturing. Only a difference from FIG. 11A will be described. The difference is that the signal hadd is set to be at a high level. Therefore, addition averaging is performed on pixels of the same color in a horizontal direction.

Figure 11C:
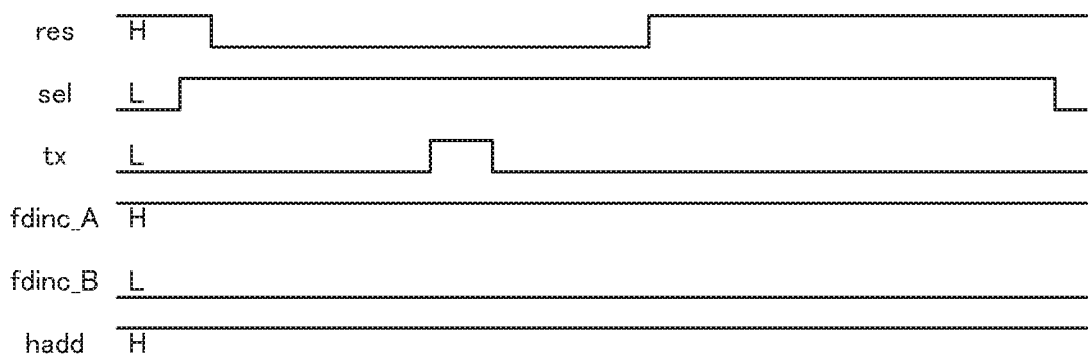

FIG. 11C is a timing diagram illustrating a readout operation of the imaging element 107 during the acquisition of the light modulation image data 1 and 2. Only a difference from FIG. 11B will be described. The difference is that the signal fdinc_B is set to be at a low level. Therefore, it is possible to read out signals in two kinds of gains (A and B). The signals fdinc_A and fdinc_B are in a reciprocal relation, and have the levels thereof changed in accordance with each horizontal synchronous period.

In the imaging element configured to temporally read out multiple rows of pixel signals in parallel in one horizontal synchronous period corresponding to high-speed readout through the above-described operations, it is possible to switch a gain without deteriorating a vertical resolution for every gain.

Modification Embodiment

In the first embodiment, an example in which two kinds of different gains of the gain A and the gain B are selected has been described, but there is no limitation on the value of a selected gain and the number of kinds. For example, the FDinc switching element 307 and the additional capacitor 308 can be further configured to be formed in parallel in a unit pixel 200. In the FD portion 303 which is a first capacitor unit, a state can be arbitrarily selected from a first state in which two additional capacitors are connected as a second capacitor unit, a second state in which one additional capacitor is connected, and a third state in which an additional capacitor is not connected. It is possible to appropriately acquire signals by which three kinds of different gains are multiplied.

In addition, a scheme in which signals are read out by performing addition averaging for every three pixels in a horizontal direction (a column direction) during LV capturing and during the acquisition of the light modulation image data has been described. The number of pixels in which addition averaging is performed is arbitrary, and signal readout can be performed by performing addition averaging using the number of pixels according to a device specification, image capturing conditions, or the like. In addition, a scheme in which signals of pixels in a vertical direction are thinned and read out with a period of two rows to every twelve rows during LV capturing or during the acquisition of the light modulation image data has been described, but the number of pixels in which thinning is performed is arbitrary, and thinning readout can be performed with a set period.

In the first embodiment, in a scheme in which pixels in a vertical direction are thinned and read out with a period of two rows to every twelve rows, an example in which a gain is switched has been described. There is no limitation thereto, and in a scheme in which all-pixel readout is performed as in a readout scheme during still image capturing, an operation in which a gain is switched may be performed. For example, an assumption is made of a case where gain switching is realized with a period of four rows for every two rows with respect to rows read out in a scheme in which all-pixel readout is performed. In this case, the fdinc signal generation unit (FIG. 4) is divided into eight kinds, and eight kinds of fdinc signal generation units are configured to be connected to the AND circuits 407 with an eight-row period with respect to a pixel array row. Regarding the row control signal, in a scheme in which all-pixel readout is performed, a setting is performed to be controlled to A, A, B, B, A, A, B, B. In a scheme in which pixels in a vertical direction are thinned and read out with a period of two rows to every twelve rows, a setting is performed to be controlled to A, A, A, A, B, B, B, B. The CPU 109 performs switching of a setting, and thus can switch a gain with a constant period with respect to read-out rows even with different readout periods.

In the first embodiment, an example in which gain switching is realized by switching the capacity of the FD portion has been shown, but there is no limitation thereto. For example, there is a configuration in which the column circuit 203 has an analog gain amplifier capable of multiplying every vertical signal line by a plurality of corresponding gains. Control for switching a gain for each row is performed by the analog gain amplifier.

In addition, there is no limitation to a configuration example in which, if the shutter release button is pressed, the light modulation image data is acquired. A configuration may be used in which the light modulation image data is acquired if an operation button for light modulation is pressed during LV capturing, the calculated amount of light emission is determined as the amount of main light emission, and returning to LV capturing is performed if the pressing of the operation button for light modulation is released.

An embodiment in which a plurality of readout schemes shown below can be selectively used is available.

First readout scheme: a scheme in which readout or readout based on addition averaging is performed with a first period in a first direction (for example, a vertical direction) of the imaging element.

Second readout scheme: a scheme in which readout or readout based on addition averaging is performed with a second period in the first direction (for example, the vertical direction) of the imaging element.

A change can be performed by control of the CPU 109 so that a period of arrangement of the first and second pixel groups in which pixel signals are read out using the first readout scheme and a period of arrangement of the first and second pixel groups in which pixel signals are read out using the second readout scheme are different from each other. For example, the first period is a period in which thinning readout of two rows to every twelve rows is perform, and the second period is 1 (all-row readout). Since the period of the first and second pixel groups which are periodically arranged in a pixel array can be arbitrarily set in accordance with a readout scheme, it is possible to improve the degree of freedom of signal readout. It is also possible to use three or more readout schemes.

Second Embodiment

Next, a second embodiment of the present invention will be described. In the present embodiment, the same elements as those in the first embodiment are denoted by signs or symbols which are already used, and thus the detailed description thereof will be omitted. Such a description omission method also applies to an embodiment to be described later.

In the present embodiment, an example in which gain switching is performed for the purpose of enlarging a dynamic range during the acquisition of the light modulation image data will be described. In the first embodiment, an example in which a gain is switched in the row direction during the acquisition of the light modulation image data, that is, the vertical direction of the imaging element is shown. In case of being intended for DR enlargement during the acquisition of the light modulation image data, gain switching in the row direction only is not performed, and gain switching may be performed, for example, on hound's tooth check in units of two rows and two columns. That is, it is possible to realize DR enlargement during the acquisition of the light modulation image data even in a horizontal direction through gain switching in units of two rows and two columns, and to acquire light modulation image data having a high resolution in a horizontal direction. In the present embodiment, as an example in which the first and second pixel groups are arranged with a period corresponding to an even number of rows and an even number of columns, an example in which gain switching is performed on hound's tooth check in two rows and two columns is shown.

Figure 12:
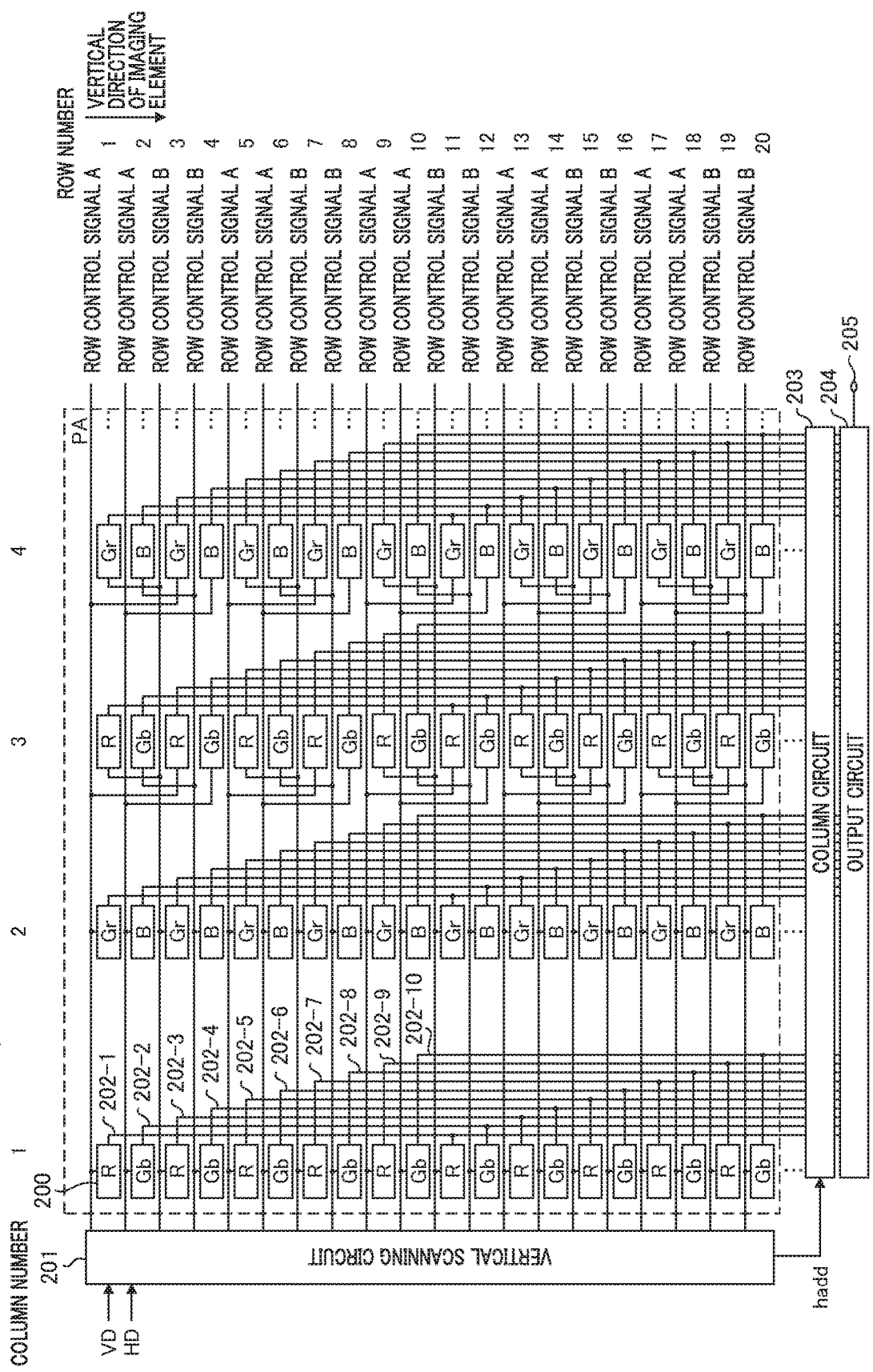
FIG. 12 is a schematic diagram illustrating an overall configuration of an imaging element according to a second embodiment of the present invention.

A gain switching example in the present embodiment will be described with reference to FIG. 12. FIG. 12 is a diagram illustrating an overall configuration of an imaging element 107 according to the present embodiment. The overall configuration in the present embodiment is different from the overall configuration of the imaging element 107 described in FIG. 2, in that row control signal lines are connected to columns of column number 3 and column number 4. Specifically, row control signals A, A, B, B, A, A, B, B . . . are input to columns of column number 1 and column number 2 in correspondence to row numbers 1, 2, 3, 4, 5, . . . . Row control signals B, B, A, A, B, B, A, A . . . are input to the columns of column number 3 and column number 4 in correspondence to row numbers 1, 2, 3, 4, 5, . . . , and this relationship is repeated in a horizontal direction. That is, with n set to a variable of a natural number equal to or greater than 2, a pattern of the same row control signal as column number 1 and column number 2 is shown in a (4n−3)-th column and a (4n−2)-th column, and a pattern of the same row control signal as column number 3 and column number 4 is shown in a (4n−1)-th column and a 4n-th column.

In the present embodiment, if the signal fdinc is set to be made different in the row control signal A and the row control signal B, it is possible to perform gain switching in units of two rows and two columns. That is, it is possible to switch a gain on hound's tooth check using pixel groups of two rows and two columns, adjacent to each other among ten rows in which signals are temporally read out in parallel in one horizontal synchronous period, as one unit.

Third Embodiment

Next, a third embodiment of the present invention will be described. In the first embodiment, an example in which signals are read out by performing thinning-out with a period of two rows to every twelve rows in a vertical direction during LV capturing or during the acquisition of the light modulation image data has been shown. In this case, since signal readout is not performed in thinned-out rows, there is a possibility of a decrease in a resolution in a vertical direction. In the present embodiment, as an example in which a decrease in a resolution is suppressed during thinning readout, an example in which pixel rows equivalent to four rows to every twelve rows in a vertical direction are selected and signals are read out by performing addition averaging on every two rows among them on vertical signal lines will be described.

Figure 13:
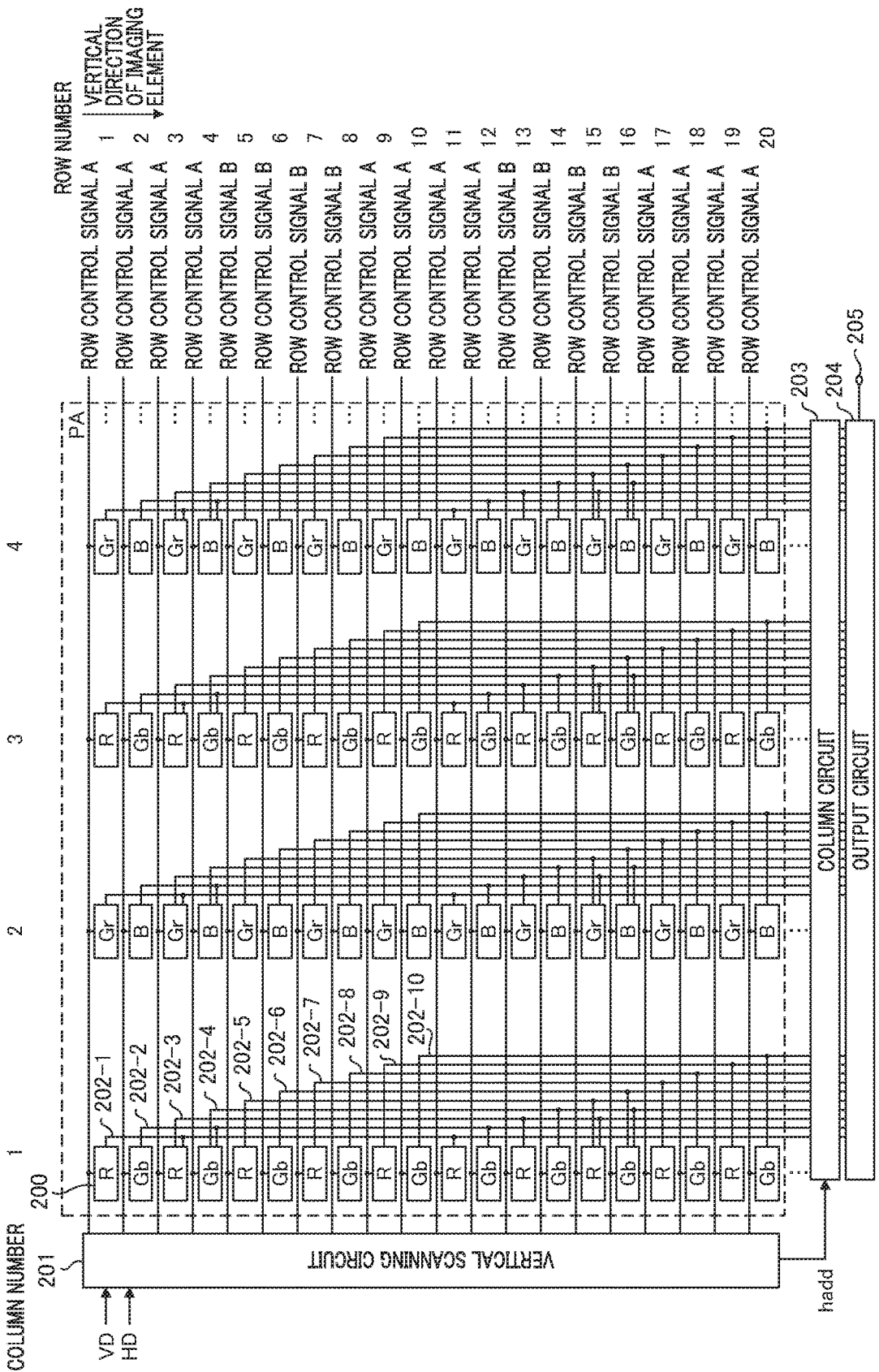
FIG. 13 is a schematic diagram illustrating an overall configuration of an imaging element according to a third embodiment of the present invention.

FIG. 13 is a diagram illustrating an overall configuration of an imaging element 107 according to the present embodiment. A difference from the configuration shown in FIG. 2 is that pixel units corresponding to rows of row numbers 3, 4, 15, 16, . . . are connected to two different vertical signal lines 202. For example, a pixel unit of row number 3 is connected to vertical signal lines 202-1 and 202-3, and a pixel unit of row number 4 is connected to vertical signal lines 202-2 and 202-4.

Figure 14:
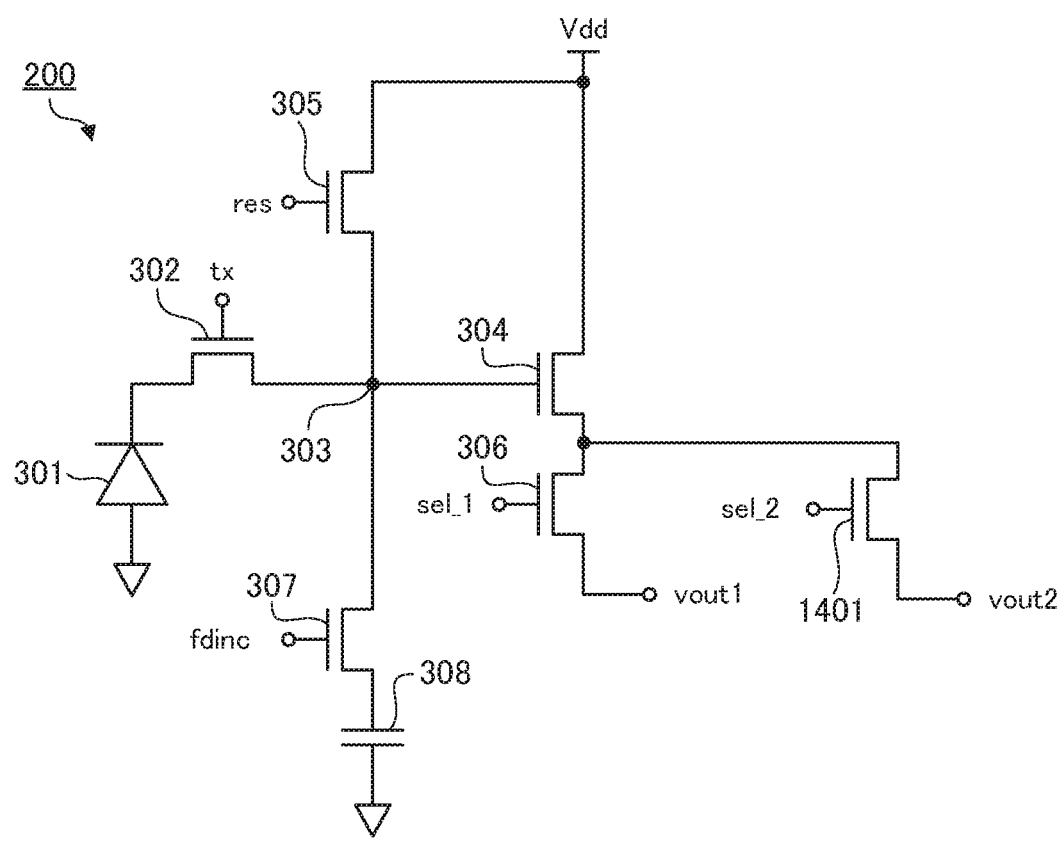
FIG. 14 is a diagram illustrating a circuit configuration of one pixel of the imaging element according to the third embodiment.

The configuration of a unit pixel 200 corresponding to rows of row numbers 3, 4, 15, 16, . . . will be described with reference to FIG. 14. A difference from the configuration shown in FIG. 3 is that a pixel selection switching element 1401 is added. The pixel selection switching element 1401 is connected to the FD amplifier 304, and is disposed in parallel to the pixel selection switching element 306. The pixel selection switching element 1401 can output (see vout2) a pixel signal to a vertical signal line different from that of the pixel selection switching element 306.

The pixel selection switching element 306 and the pixel selection switching element 1401 are controlled by a signal sel_1 and a signal sel_2, respectively. Meanwhile, the configuration of a pixel unit corresponding to rows other than row numbers 3, 4, 15, 16, . . . is the same as that in the first embodiment, and the signal sel of the pixel unit is a signal in which a logical OR operation between the signal sel_1 and the signal sel_2 is performed, and is input to the pixel selection switching element 306.

Next, a signal readout method of the imaging element 107 will be described with reference to FIGS. 15A to 15C. A signal readout method during still image capturing shown in FIG. 15A is the same as that in FIG. 10A described in the first embodiment, and thus the description thereof will not be given.

FIG. 15B is a diagram illustrating a signal readout method during LV capturing, and FIG. 15C is a diagram illustrating a signal readout method during the acquisition of the light modulation image data. In FIGS. 15B and 15C, a process of additionally averaging and reading out pixel signals of two rows of the same color adjacent to each other in a vertical direction, that is, row numbers 1 and 3, and 2 and 4 is performed. Similarly, a process of additionally averaging and reading out pixel signals of row numbers 13 and 15, 14 and 16, 25 and 27, and 26 and 28 is also performed. In this way, the CPU 109 selects pixel rows equivalent to four rows to every twelve rows in a vertical direction, and performs control for additionally averaging and reading out every two rows among them on vertical signal lines.

Figure 16A:
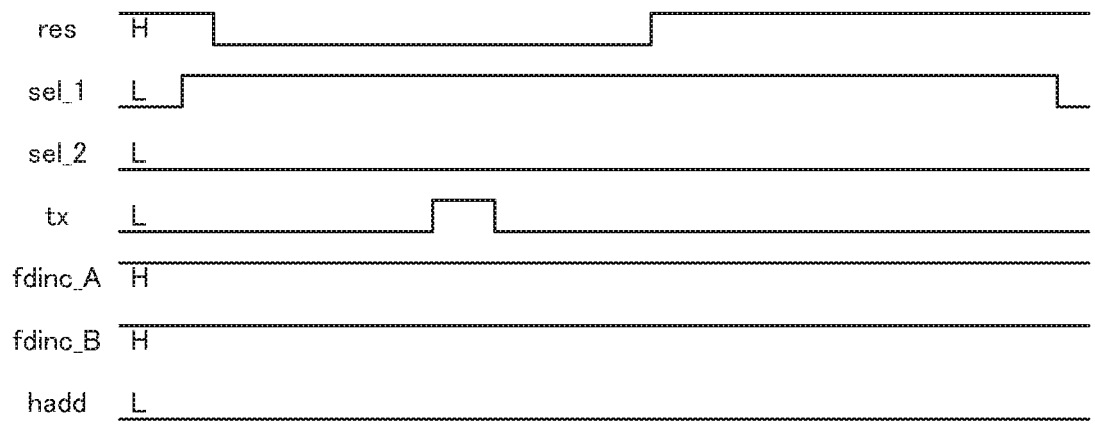
FIGS. 16A to 16C are timing diagrams illustrating signal readout operations at 1H of the imaging element according to the third embodiment.

Next, signal readout operations of the imaging element 107 will be described with reference to FIGS. 16A to 16C. FIG. 16A is a timing diagram illustrating a signal readout operation of the imaging element 107 in one horizontal synchronous period when a still image signal is acquired in the gain A with respect to signals of all the pixels. The signal sell changes from a low level to a high level, but the signal sel_2 is set to be at a low level. Thereby, the same signal readout operation as that in the first embodiment is performed.

Figure 16B:
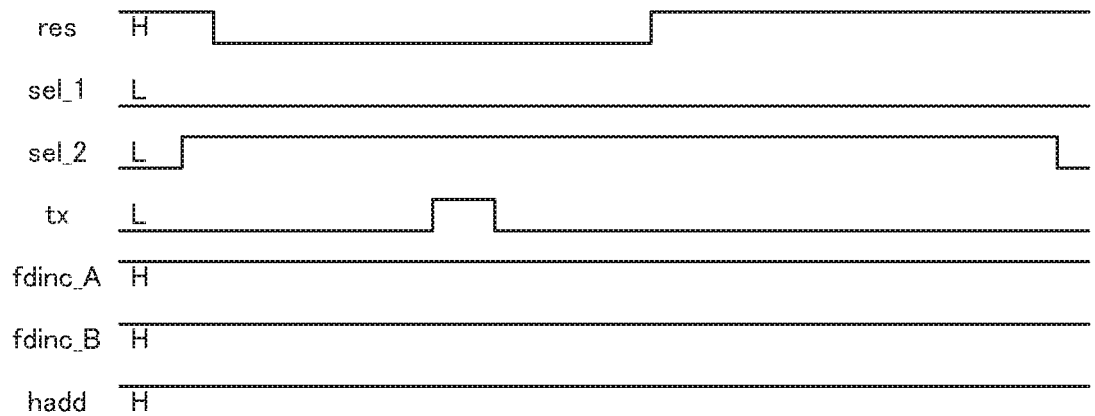
Figure 16C:
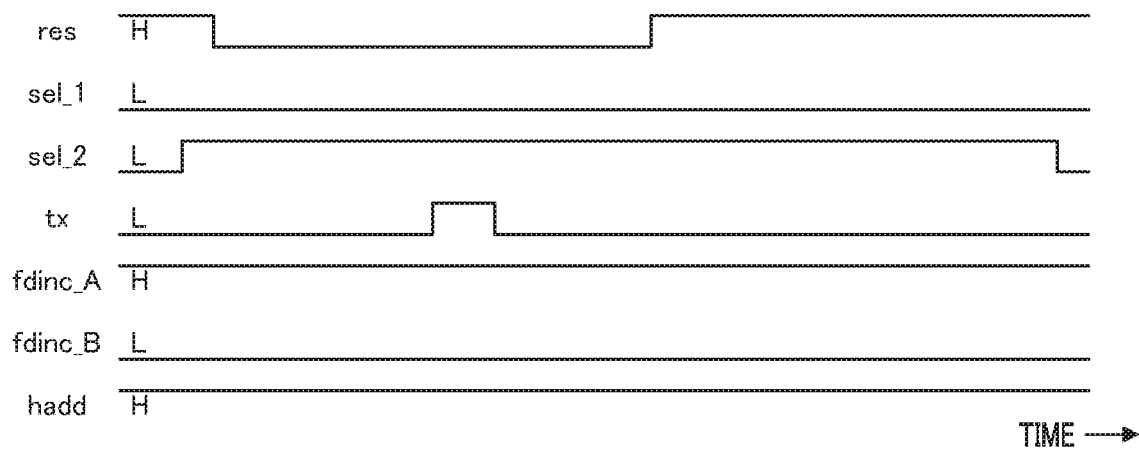

FIGS. 16B and 16C are timing diagrams illustrating signal readout operations of the imaging element 107 during LV capturing and during the acquisition of the light modulation image data, respectively. In each case, the signal sel_1 is set to be at a low level, and the signal sel_2 changes from a low level to a high level. By performing control in this way, pixel units corresponding to, for example, row numbers 1 and 3 are connected to the same the vertical signal line 202-1, and signal addition averaging is performed on the vertical signal line.

According to the present embodiment, since the number of thinned-out rows can be reduced, it is possible to enhance a resolution in a vertical direction in an acquired image. Meanwhile, in the present embodiment, a configuration example in which pixel units having two pixel selection switching elements are pixel units belonging to only a portion of rows is shown, but without being limited thereto, all the pixel units may be each configured to have two pixel selection switching elements.

In the embodiment, in a plurality of pixel rows which are read out for every unit horizontal synchronizing signal, it is possible to read out signals in parallel by multiplying different gains by signals of the first and second pixel groups classified by row control signals. Thus, it is possible to provide an imaging device capable of photometry driving having a higher accuracy relating to a spatial resolution while speeding up readout of an image signal.

Other Embodiments

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070750, filed Apr. 2, 2019 which is hereby incorporated by reference wherein in its entirety.

What is claimed is:

1. An imaging device comprising:
an imaging element capable of reading out a plurality of rows of pixel signals in parallel for each horizontal synchronizing signal from pixel groups constituted by unit pixels having a photoelectric converter, the imaging element comprising a controller configured to perform readout control by multiplying gains by pixel signals of a first pixel group controlled by a first row control signal and pixel signals of a second pixel group controlled by a second row control signal among the pixel groups,
wherein the first and second pixel groups are periodically arranged in a first direction of the imaging element,
wherein the controller performs control for multiplying a first gain by the pixel signals of the first pixel group and multiplying a second gain by the pixel signals of the second pixel group, and
wherein, if image signals which are output by the imaging element are displayed or recorded, the controller performs control for multiplying the first gain by the pixel signals of the first and second pixel groups.

2. The imaging device according to claim 1, further comprising a light-emitter,
wherein, if image capturing is performed by causing the light-emitter to emit light, the controller performs control for reading out a signal obtained by multiplying the first gain by the pixel signals of the first pixel group and a signal obtained by multiplying the second gain by the pixel signals of the second pixel group before an amount of light emission of the light-emitter is determined.

3. The imaging device according to claim 1, wherein a period of arrangement of the first and second pixel groups in which pixel signals are read out using a first scheme for performing readout or readout based on addition averaging with a first period in the first direction and a period of arrangement of the first and second pixel groups in which pixel signals are read out using a second scheme for performing readout or readout based on addition averaging with a second period in the first direction are different from each other.

4. An imaging device comprising:
pixel groups in which a plurality of unit pixels, each having a photoelectric converter, are arranged in a matrix;
a plurality of column signal lines, in which m column signal lines are arranged in each pixel column in the pixel groups; and
a controller configured to control multiplying and reading out pixel signals of a first pixel group consisting of n (n<m) rows among the pixel groups by a first gain, and multiplying and reading out pixel signals of a second pixel group consisting of n rows by a second gain,
wherein, if image signals which are output by an imaging element are displayed or recorded, the controller performs control for multiplying the first gain by the pixel signals of the first and second pixel groups.

5. The imaging device according to claim 4, wherein each of the first and second pixel groups consists of an even number of rows of pixel groups.

6. The imaging device according to claim 4,
wherein each of the plurality of unit pixels includes a first capacitor that converts charge generated in the photoelectric convertor into a voltage, a second capacitor capable of connecting to the first capacitor, and a switching element that controls a connection and a non-connection between the first capacitor and the second capacitor, and
the controller switches the first gain and the second gain by controlling the switching element.

7. The imaging device according to claim 4, further comprising an amplifier configured to multiply a plurality of gains by pixel signals,
wherein the controller switches the first gain and the second gain by controlling the amplifier.

8. The imaging device according to claim 4, further comprising a light-emitter,
wherein, if image capturing is performed by causing the light-emitter to emit light, the controller performs control for reading out a signal obtained by multiplying the first gain by the pixel signals of the first pixel group and a signal obtained by multiplying the second gain by the pixel signals of the second pixel group before an amount of light emission of the light-emitter is determined.

9. An imaging device comprising:
pixel groups in which a plurality of unit pixels, each having a photoelectric converter, are arranged in a matrix;
a readout unit configured to be capable of reading out m rows of pixel signals in parallel for each horizontal synchronizing signal from the pixel groups; and
a controller configured to control multiplying and reading out pixel signals of a first pixel group consisting of n (n<m) rows among the pixel groups by a first gain, and multiplying and reading out pixel signals of a second pixel group consisting of n rows by a second gain,
wherein, if image signals which are output by an imaging element are displayed or recorded, the controller performs control for multiplying the first gain by the pixel signals of the first and second pixel groups.

10. The imaging device according to claim 9, wherein each of the first and second pixel groups consists of an even number of rows of pixel groups.

11. The imaging device according to claim 9,
wherein each of the plurality of unit pixels includes a first capacitor that converts charge generated in the photoelectric convertor into a voltage, a second capacitor capable of connecting to the first capacitor, and a switching element that controls a connection and a non-connection between the first capacitor and the second capacitor, and
the controller switches the first gain and the second gain by controlling the switching element.

12. The imaging device according to claim 9, further comprising an amplifier configured to multiply a plurality of gains by pixel signals,
wherein the controller switches the first gain and the second gain by controlling the amplifier.

13. The imaging device according to claim 9, further comprising a light-emitter,
wherein, if image capturing is performed by causing the light-emitter to emit light, the controller performs control for reading out a signal obtained by multiplying the first gain by the pixel signals of the first pixel group and a signal obtained by multiplying the second gain by the pixel signals of the second pixel group before an amount of light emission of the light-emitter is determined.

* * * * *